(12) United States Patent
Nichols

(10) Patent No.: US 9,410,863 B2
(45) Date of Patent: Aug. 9, 2016

(54) TORQUE TOOL CALIBRATION FIXTURE

(71) Applicant: Honda Motor Co., Ltd., Tokyo (JP)

(72) Inventor: Thomas R. Nichols, Wellington, AL (US)

(73) Assignee: Honda Motor Co., Ltd., Tokyo (JP)

( * ) Notice: Subject to any disclaimer, the term of this patent is extended or adjusted under 35 U.S.C. 154(b) by 423 days.

(21) Appl. No.: 14/105,225

(22) Filed: Dec. 13, 2013

(65) Prior Publication Data

US 2015/0168245 A1    Jun. 18, 2015

(51) Int. Cl.
*G01L 25/00* (2006.01)
*G01L 5/24* (2006.01)

(52) U.S. Cl.
CPC *G01L 25/003* (2013.01); *G01L 5/24* (2013.01)

(58) Field of Classification Search
None
See application file for complete search history.

(56) References Cited

U.S. PATENT DOCUMENTS

| | | | |
|---|---|---|---|
| 4,171,647 A | 10/1979 | Herrgen | |
| 4,583,411 A | 4/1986 | Hales | |
| 5,099,678 A | 3/1992 | Grabovac et al. | |
| 5,181,425 A | 1/1993 | Livingston | |
| 7,885,780 B2 | 2/2011 | Lucke | |
| 8,117,887 B2 | 2/2012 | Schwafertz et al. | |

*Primary Examiner* — Robert R Raevis
(74) *Attorney, Agent, or Firm* — Rankin, Hill & Clark LLP

(57) ABSTRACT

A torque tool calibration fixture includes a support and a mounting plate movably secured thereto. The plate is configured to have a torque tool mounted thereto for calibration. A transducer is secured to the mounting plate for movement therewith. The transducer has one end portion configured to be coupled to a drive end of a head portion of the associated torque tool and an opposite end portion. A joint assembly is fixed to the support and coupled to the opposite end portion of the transducer. The joint assembly defines a rotational axis and the mounting plate is movable along the rotational axis. A torque analyzer is in communication with the transducer. Rotation of the joint assembly results in the joint assembly forming a hard joint where further rotation of the joint assembly is prevented. The analyzer indicates actual exerted torque on the hard joint as measured by the transducer.

20 Claims, 5 Drawing Sheets

TORQUE TOOL CALIBRATION FIXTURE

BACKGROUND

Torque tools provide a means by which a threaded fastener can be tightened to a pre-determined value of tension. These tools must be calibrated at regular intervals to ensure they are functioning effectively and accurately. The procedure for calibrating a torque tool typically requires that the tool be sent to a facility that specializes in torque tool calibration. The owner of the torque tool is usually required to pay for the shipping of the tool both ways. Once the torque tool arrives at the facility, the tool is calibrated and then shipped back to the owner. The time that is required to calibrate the torque tool can significantly vary, depending on the size and capabilities of the calibration facility, and the number of torque tools that are in line to be calibrated.

BRIEF DESCRIPTION

In accordance with one aspect, a torque tool calibration fixture comprises a support and a mounting plate movably secured to the support. The plate is configured to have an associated torque tool mounted thereto for calibration. A transducer is secured to the mounting plate for movement therewith. The transducer has one end portion configured to be coupled to a drive end of a head portion of the associated torque tool and an opposite end portion. A joint assembly is fixed to the support and coupled to the opposite end portion of the transducer. The joint assembly defines a rotational axis and the mounting plate is movable along the rotational axis of the joint assembly. A torque analyzer is in communication with the transducer. Rotation of the joint assembly results in the joint assembly forming a hard joint where further rotation of the joint assembly is prevented. The torque analyzer indicates actual exerted torque on the hard joint as measured by the transducer.

In accordance with another aspect, a torque tool calibration fixture comprises a support and a mounting plate moveably secured to the support. The plate has mounted thereto a torque tool for calibration. A first fixture is mounted to the mounting plate. A head portion of the torque tool is attached the first fixture to prevent movement of the torque tool relative to the mounting plate. A transducer is secured to the first fixture opposite the torque tool head portion. The transducer has one end portion coupled to a drive end of the torque tool head portion and an opposite end portion coupled to a joint assembly connected to a second fixture fixed to the support. A torque analyzer is in communication with the transducer. Actuation of the torque tool causes rotation of the joint assembly. The torque analyzer indicates actual exerted torque on the joint assembly as measured by the transducer. The actual exerted torque is compared to a torque value indicated on the torque tool and an adjustment of the torque tool is performed depending on the torque comparison.

In accordance with yet another aspect, a method of calibrating a torque tool comprises mounting a head portion of a torque tool on a first fixture provided on a movable mounting plate; mounting a transducer on the first fixture opposite the torque tool head portion; coupling one end portion of the transducer to a drive end of the torque tool head portion and coupling an opposite end portion of the transducer to a joint assembly connected to a fixed second fixture spaced from the mounting plate; applying a predetermined amount of torque to the joint assembly and measuring actual exerted torque with the transducer; comparing the actual exerted torque to a torque value indicated on the torque tool resulting in a torque comparison; and calibrating the torque tool depending on the torque comparison.

DETAILED DESCRIPTION

It should, of course, be understood that the description and drawings herein are merely illustrative and that various modifications and changes can be made in the structures disclosed without departing from the present disclosure. In general, the figures of the exemplary torque tool calibrating fixture are not to scale. It will also be appreciated that the various identified components of the exemplary torque tool calibrating fixture disclosed herein are merely terms of art that may vary from one manufacturer to another and should not be deemed to limit the present disclosure.

Figure 1:
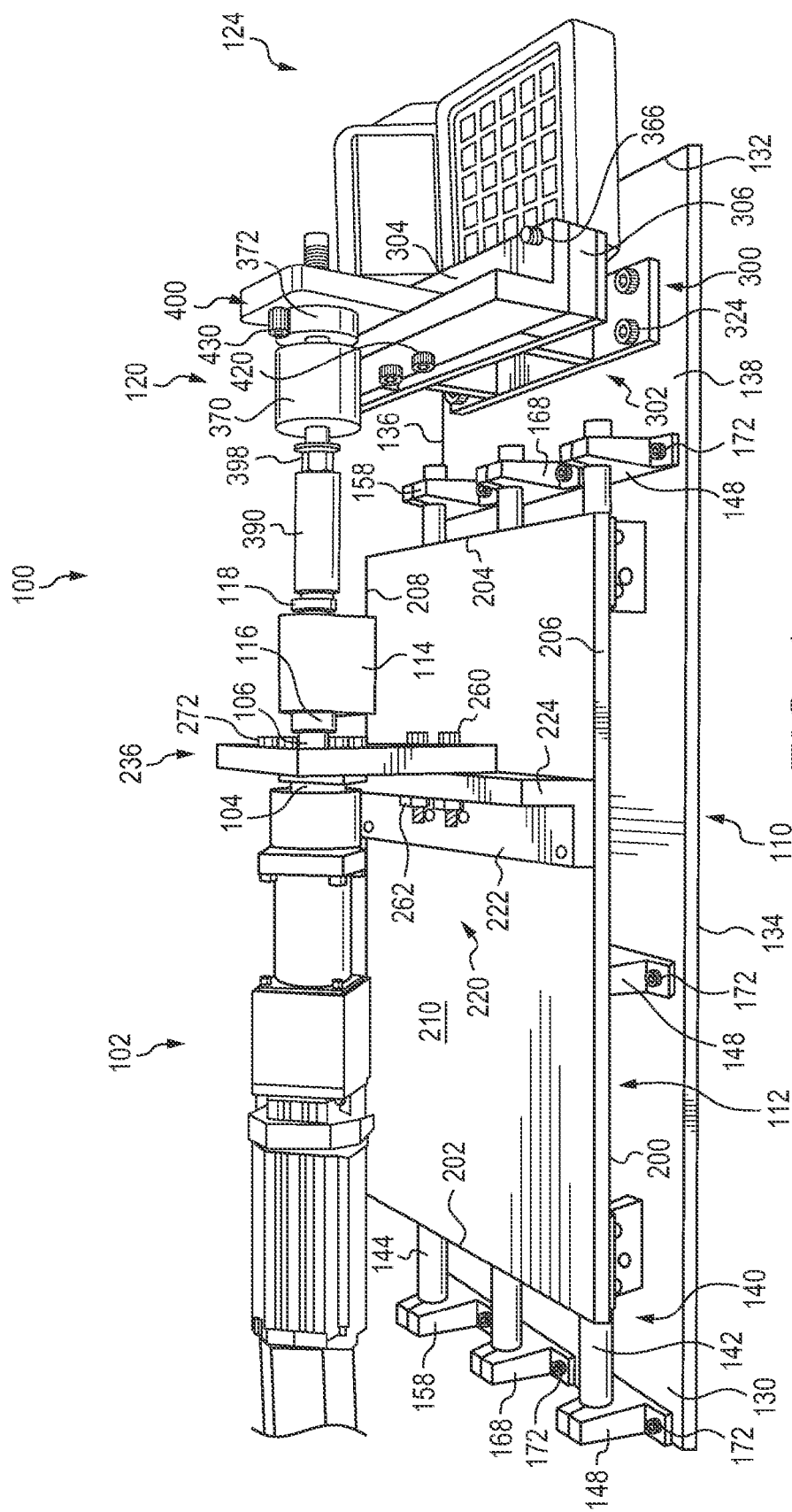
FIG. 1 is a perspective view of an exemplary torque tool calibrating fixture.
Figure 2:
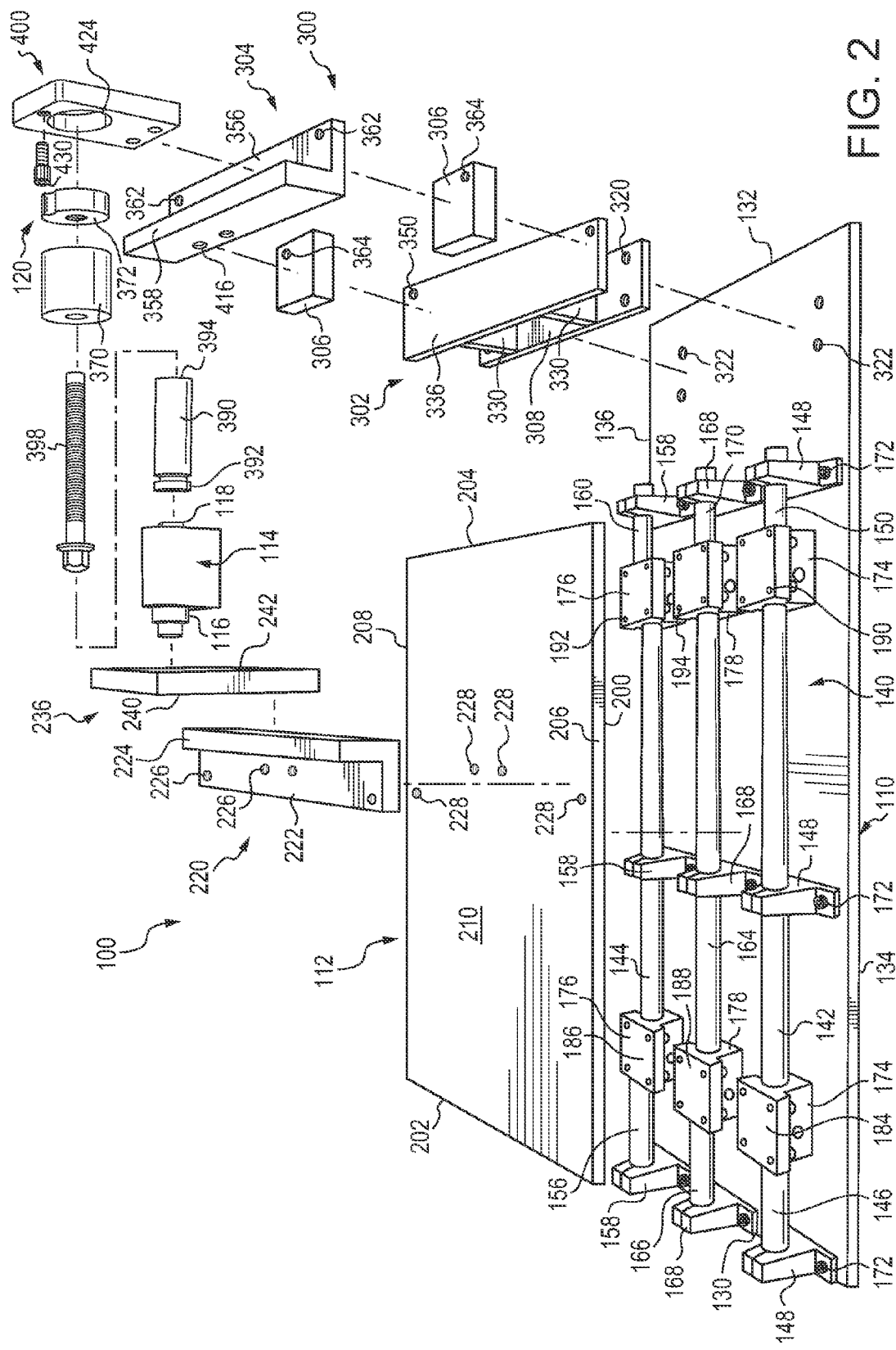
FIG. 2 is an exploded perspective view of the torque tool calibrating fixture of FIG. 1.

Referring now to the drawings, wherein like numerals refer to like parts throughout the several views, FIGS. 1 and 2 illustrate a fixture 100 according to the present disclosure for calibrating a torque tool 102. The depicted toque tool 102 generally includes a head portion 104 having a drive end 106 and is one example of a torque tool that can be calibrated on the fixture 100. It will be appreciated by one skilled in the art from the description below that the exemplary fixture 100 is configured to calibrate torque tools of various manufacturers. The calibrating fixture 100 includes a support 110 and a mounting plate 112 secured to the support 110 and movable in a lengthwise direction (i.e., movable along the greatest dimension) of the support 110. The mounting plate 112 is configured to have mounted thereto the torque tool 102 for calibration. A transducer 114 is secured to the mounting plate 112 for movement therewith. The transducer 114 has one end portion 116 coupled to the drive end 106 of the torque tool head portion 104 and an opposite end portion 118 coupled to a joint assembly 120 fixed to the support 110. A torque analyzer 124 is in communication with the transducer.

The support 110 includes end portions 130, 132 and side portions 134, 136 extending lengthwise between the end portions. As depicted, the support 110 can be rectangular shaped; although, this is not required. The support 110 further includes a top surface 138 having mounted thereto a slide device 140. The slide device 140 can includes at least a pair of spaced parallel rails 142, 144 which extend lengthwise on the support 110. Rail 142 has a first end portion 146 secured in a mount 148 located adjacent the end portion 130 of the support 110 and a second end portion 150 secured in a mount 148 near the end portion 132 of the support 110. Similarly, rail 144 has a first end portion 156 secured in a mount 158 located adjacent the end portion 130 of the support 110 and a second end portion 160 secured in a mount 158 near the end portion 132 of the support 110. An additional mount 148, 158 can be provided generally centrally on each respective rail 142, 144 for further supporting the rail on the support 110. According to one aspect, the slide device 140 can include a third rail 164 which is located between the rails 142, 144. The third rail 164 can also have first and second end portions 166, 170 secured in mounts 168 and an additional mount 168 can be provided generally centrally on the third rail 162. Each mount 148, 158, 168 is fixedly attached to the top surface 138 of the support 110 and may be connected by any mechanical means known in the art, such as but not limited to the illustrated fasteners 172.

The mounting plate 112 is attached to the rails 142, 144, 164 of the slide device 140 such that the mounting plate 112 is movable longitudinally on the rails to accommodate torque tools of differing lengths. In this way, the fixture 100 is adjustable to different sizes of torque tools to be calibrated. Slides 174 are movable longitudinally on the rail 142. As illustrated, one slide 174 is located between one of the end mounts 148 and the central mount and the other slide 174 is located between the central mount 148 and the other end mount 148. Slides 176 are movable longitudinally on the rail 144. One slide 176 is located between one of the end mounts 158 and the central mount 158 and the other slide 176 is located between the central mount 158 and the other end mount 158. Slides 178 are movable longitudinally on the third rail 164. One slide 178 is located between one of the end mounts 168 and the central mount 168 and the other slide 178 is located between the central mount 168 and the other end mount 168. Each slide 174, 176, 178 includes a respective mounting surface 184, 186, 188 having mounting holes 190, 192, 194. To attach the mounting plate 112 to the slides 174, 176, 178, fasteners (not shown) extend through the mounting holes 190, 192, 194 and threadingly engage corresponding mounting holes (not shown) located on a bottom surface 200 of the mounting plate 112.

Figure 6:
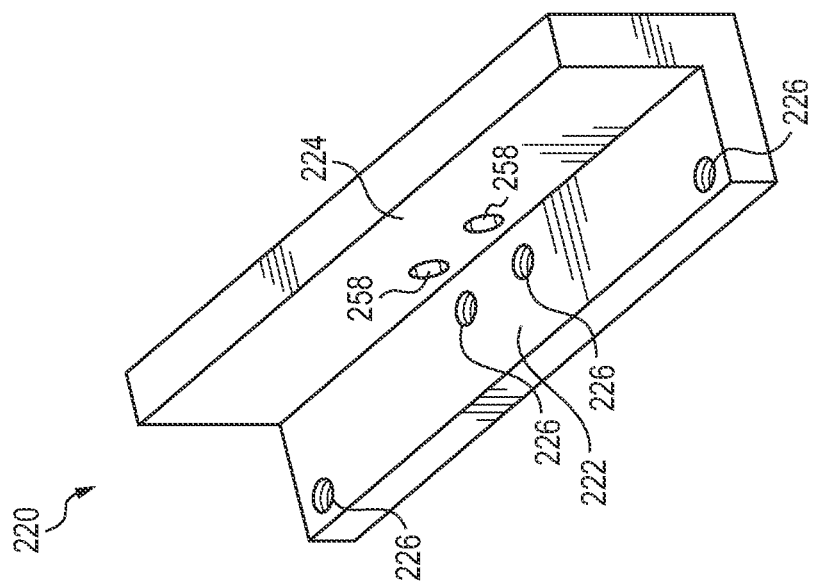
FIG. 6 is a perspective view of a first fixture of the torque tool calibrating fixture of FIG. 1.

With continued reference to FIGS. 1 and 2, the mounting plate 112 includes end portions 202, 204 and side portions 206, 208 extending lengthwise between the end portions. The end portions 202, 204 can be dimensioned approximately the same as the end portions 130, 132 of the support 110; however, the side portions 206, 208 are dimensioned smaller than the side portions 134, 136 of the support 110. As depicted, the mounting plate 112 can be rectangular shaped; although, this is not required. The mounting plate 112 further includes a top surface 210 having mounted thereto a first fixture 220. As also depicted in FIG. 6, the first fixture 220 includes a first section 222 and a second section 224 extending perpendicularly from the first section 222. Each of the first section 222 and second section 224 can extend approximately the entire width dimension of the mounting plate 112. The second section 224 has a height dimension that allows the second section to extend beneath the head portion 104 of the torque tool 102. As shown, the first fixture 220 is L-shaped; although, this is not required. The first section 222 includes mounting holes 226, which can be threaded, having a mounting pattern corresponding to a mounting pattern of threaded mounting holes 228 (FIG. 2) provided on the top surface 210 of the mounting plate 112. The first fixture 220 is fixedly attached to the top surface 210 by any mechanical means known in the art, such as but not limited to the threaded fasteners (not shown) which extend through the mounting holes 228 from beneath the mounting plate 112 and threadingly engage the mounting holes 226.

Figure 3:
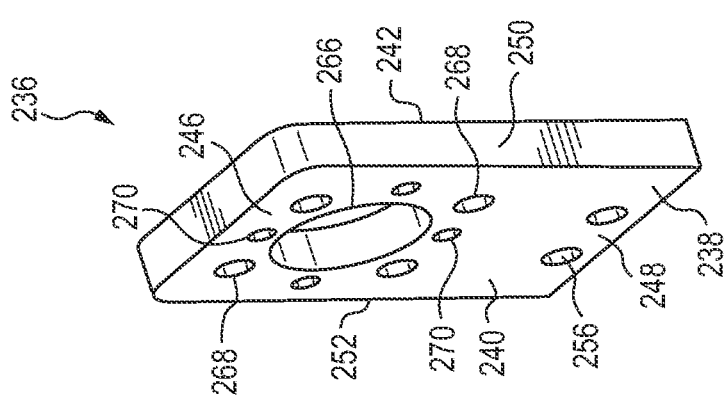

The head portion 104 of the torque tool 102 is attached to the first fixture 220. In the depicted embodiment, a first holder 236 is mounted to the first fixture 220. As best depicted in FIG. 3, the first holder 236 has a body 238 including a first surface 240 and a second surface 242 opposite the first surface 240. The body 238 further includes an upper end portion 246, a lower end portion 248 and side portions 250, 252. A pair of mounting holes 256, which can be threaded, extends through the lower end portion 248 and correspond to a pair of mounting holes 258 (FIG. 6) provided on the second section 224 of the first fixture 220. The first holder 236 is fixedly attached to the first fixture 220 by any mechanical means known in the art, such as but not limited to the threaded fasteners 260 which extend through the mounting holes 258 and threadingly engage the mounting holes 256. Nuts 262 can be threaded onto the ends of the fasteners 260 to further secure the first holder 236 to the first fixture 220. As indicated previously, the transducer 114 is mounted to the second surface 242 of the body 238 of the first holder 236.

Figure 5:
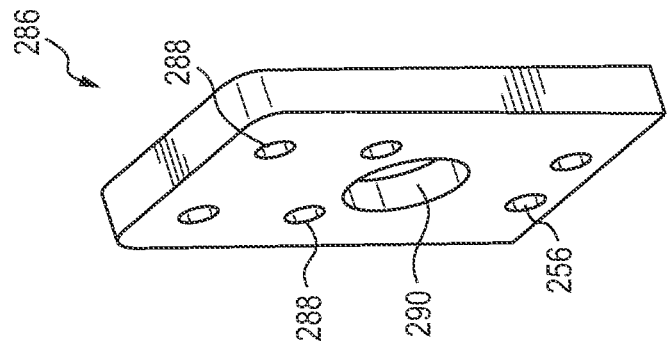
FIGS. 3 to 5 are perspective views of various embodiments of a first holder of the torque tool calibrating fixture of FIG. 1.
Figure 4:
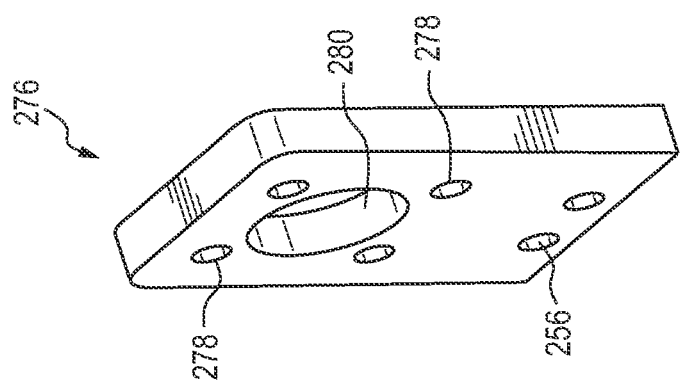

The first holder 236 is configured to have mounted to the first surface 240 of the body 238 the head portion 104 of the torque tool 102. According to one aspect, as shown in FIG. 3, an opening 266 extends through the upper end portion 246 of the body 238. The opening 266 is dimensioned to receive the drive end 106 of the torque tool head portion 104, and it should be appreciated to one skilled in the art that the opening 266 can have varying dimensions for accommodating different sized drive ends. First mounting apertures 268 having a first mounting pattern and second mounting apertures 270 having a second mounting pattern are spaced circumferentially about the opening 266. The differing mounting patterns provided by the first and second mounting apertures 268, 270 allows head portions of various torque tools to be attached to the first holder 236. To connect the head portion 104, fasteners 272 extends through either the first mounting apertures 268 or the second mounting apertures 270 and engage corresponding apertures (not shown) provided on the head portion 104. FIG. 4 depicts another embodiment of a first holder 276, the differences being that the first holder 276 only includes one set of mounting apertures 278 spaced circumferentially about an opening 280 for a drive end of a torque tool and the opening 280 can have a dimension different than a dimension of the opening 266 of the first holder 236. FIG. 5 depicts yet another embodiment of a first holder 286. In this embodiment, the first holder 286 again only includes one set of mounting apertures 288; however, the mounting apertures 288 are not spaced circumferentially about an opening 290 for a drive end of a torque tool. Instead, the opening 290 is generally centrally located on the first holder 286 between the mounting apertures 288 and the mounting holes 256. The opening 290 also has a dimension smaller than the dimension of each opening 266, 280.

With reference back to FIGS. 1 and 2, a stationary second fixture 300 is mounted to the top surface 138 of the support 110 adjacent the end portion 132, and the joint assembly 120 is connected to the second fixture 300. The second fixture 300 includes a first member 302 fixed to the support 110 and a separate second member 304 releasably secured to the first member 302. A spacer 306 can be interposed between the first and second members 302, 304. As shown, a pair of spacers 306 is provided; although, this is not required. The spacer 306 provides for differing heights of the second fixture 300 so that a rotational axis of the joint assembly 120 is aligned with a rotational axis of the drive end 106 of the torque tool head portion 104.

Figure 7:
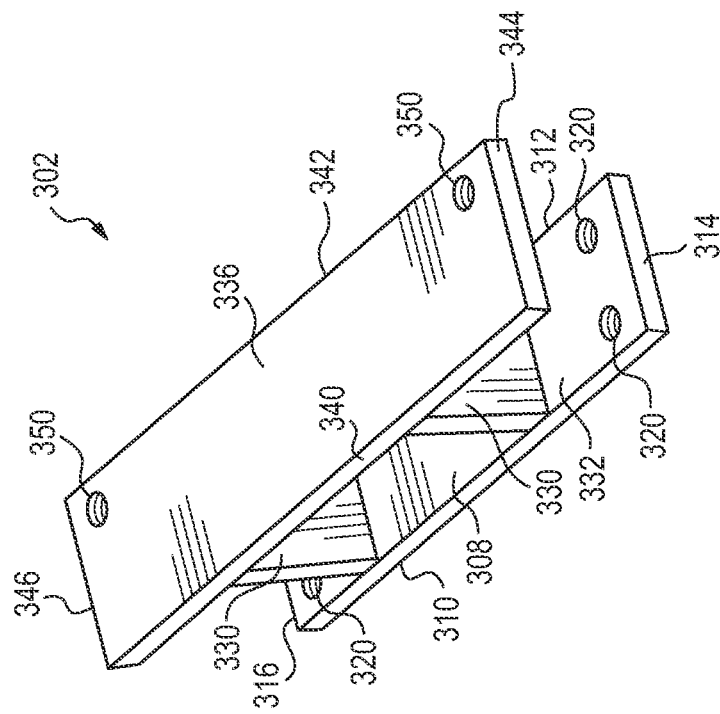
FIG. 7 is a perspective view of a part of a second fixture of the torque tool calibrating fixture of FIG. 1.

As best depicted in FIG. 7, the first member 302 includes a first base 308 having end portions 310, 312 and side portions 314, 316 extending between the end portions. The first base 308 can be rectangular shaped; although, this is not required. The first base 308 includes mounting holes 320, which can be threaded, having a mounting pattern corresponding to a mounting pattern of threaded mounting holes 322 (FIG. 2)

provided on the support 110 adjacent the support end portion 132. The first base 308 is fixedly attached to the support 110 by any mechanical means known in the art, such as but not limited to the threaded fasteners 324 (FIG. 1) which extend through the mounting holes 320 and threadingly engage the mounting holes 322. A pair of support elements 330 is fixed to a top surface 332 of the first base 308, and can extend perpendicularly from the top surface 332. It should be appreciated that in lieu of the spacer 306, the support elements 330 can have varying heights to properly position the joint assembly 120 relative to the drive end 106 of the torque tool head portion 104. Fixed to the support elements is a second base 336. The second base 336 can be shaped similar to the first base 308 and includes end portions 340, 342 and side portions 344, 346 extending between the end portions. Mounting holes 350, which can be threaded, are located at intersections of the end portion 342 and side portions 344, 346.

As shown in FIGS. 1 and 2, the second member 304 includes a first section 356 and a second section 358 extending perpendicularly from the first section 356. The first section 356 is sized to fit within a perimeter of the second base 336 of the first member 302, and can have a shape similar to the second base 336. The second section 358 has a height dimension that allows the second section to extend beneath the joint assembly 120. According to one aspect, the second member 304 of the second fixture 300 can be shaped similar to the first fixture 220; although, this is not required. The first section 356 includes mounting holes 362, which can be threaded, corresponding to the mounting holes 350 provided on the second base 336. Each depicted spacer 306 includes a mounting hole 364. To fixedly attach the second member 304 to the first member 302, each spacer 306 is positioned on the second base 336 so that the mounting holes 364 align with the mounting holes 350. The second member 304 is then positioned on the spacers 306, the mounting holes 362 of the second member being aligned with the mounting holes 364 of the spacers 306. The second member 304 is then fixedly attached to the first member 302 by any mechanical means known in the art, such as but not limited to the threaded fasteners 366 which extend from beneath the second base 336 through the mounting holes 350, 364 and threadingly engage the mounting holes 362.

Figure 8:
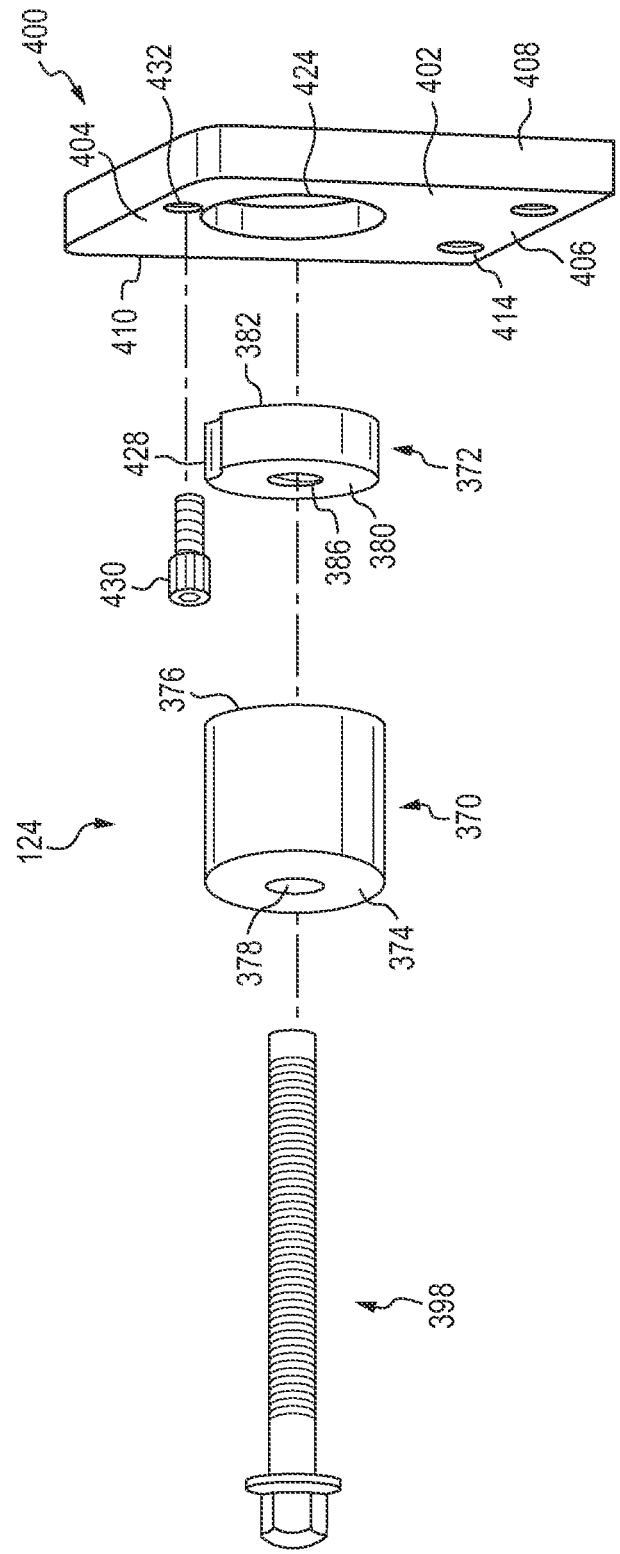
FIG. 8 is an exploded perspective view of a joint assembly for the torque tool calibrating fixture of FIG. 1.

The exemplary joint assembly 120 will be described with particular reference to FIG. 8. The joint assembly 120 includes a movable first part 370 and a separate second part 372. The first part 370, which is coupled to the transducer 114, includes a first end portion 374 and a second end portion 376. An opening or bore 378 extends through the first part 370 between the first and second end portions 374, 376. The second part 372 is fixed to the support 110 so as not to move or rotate relative to the first part 370. Similar to the first part, the second part 372 includes a first end portion 380 and a second end portion 382. An opening or bore 386 extends through the second part 372 between the first and second end portions 380, 382. As shown, each of the first part 370 and second part 372 can be cylindrical shaped; although, this is not required. As will be described below, engagement of the first and second parts 370, 372 forms a hard joint between the first and second parts. As shown in FIGS. 1 and 2, the joint assembly 120 further including a socket 390 having one end 392 coupled to the end portion 118 of the transducer 114 and an opposite end 394 coupled to the first part 370. As shown, the socket end 394 is connected to an elongated connector 398, such as the depicted fastener. The elongated connector or fastener 398 extends through the bore 378 provided in the first part 370 and threadingly engages the bore 386 of the second part 372. It should be appreciated that actuation of the torque tool 102 causes rotation of the elongated connector or fastener 398, and this rotation moves the second end portion 376 of the first part 370 into contact or engagement with the first end portion 380 of the second part 372.

The second part 372 of the joint assembly 120 is fixed to the second fixture 300. Particularly, in the depicted embodiment, a second holder 400 is mounted to the second fixture 300. As best depicted in FIG. 8, the second holder 400 has a body 402 including an upper end portion 404, a lower end portion 406 and side portions 408, 410. A pair of mounting holes 414, which can be threaded, extends through the lower end portion 406 and correspond to a pair of mounting holes 416 (FIG. 2) provided on the second section 358 of the second member 304 of the second fixture 300. The second holder 400 is fixedly attached to the second fixture 300 by any mechanical means known in the art, such as but not limited to the threaded fasteners 420 (FIG. 1) which extend through the mounting holes 416 and engage the mounting holes 414. Nuts (not shown) can be threaded onto the ends of the fasteners 420 to further secure the second holder 400 to the second member 304 of the second fixture 300. The second holder 400 together with the joint assembly 120 forms the hard joint. Particularly, an opening 424 extends through the upper end portion 404 of the body 402. The opening 424 is dimensioned to receive the second end portion 382 of the second part 372 of the joint assembly 120. To prevent the second part 372 from rotating in the opening 424 as the elongated connector or fastener 398 is being rotated by the torque tool 102, a groove 428 is provided in the second part 372. The groove at least partially receives a head of a fastener 430 which threadingly engages an aperture 432 located above the opening 424 adjacent the upper end portion 404 of the body 402 of the second holder 400. Once positioned in the groove 428, the head of the fastener 430 prevents rotation of the second part 372 relative to the second holder 400, thereby providing for a stationary second part 372 to be engaged by the movable first part 370.

With the first holder 236, 276, 286 secured to the first fixture 220 and the second holder 400 secured to the second fixture 300, and with the head portion 104 of the torque tool 102 mounted directly to the first holder 236, 276, 286 and the second part 372 of the joint assembly 120 mounted directly to the second holder 400, the first and second holders elevate the torque tool 102 together with the transducer 114 and joint assembly 120 relative to the support 110. And with the use of the spacers 306 of the second fixture 300 providing for differing heights of the second fixture, a rotational axis of the drive end 106 of the torque tool 102 can be aligned with the rotational axis of the joint assembly 120.

In operation, the torque tool 102 is mounted to the calibrating fixture 100 by connecting the head portion 104 to the first holder 236, 276, 286 of the first fixture 220. The drive end 106 is coupled to the end portion 116 of the transducer 114 and the socket 390 is coupled to the other end portion 118 of the transducer. The socket 390 is engaged to the elongated connector or fastener 398 of the joint assembly 120, which is connected to the second holder 400 of the second fixture 300. Actuation of the torque tool 102 rotates the drive end 106. This rotation is transmitted through the transducer 114 to the socket 390. The socket 390 threads the elongated connector or fastener 398 through the second part 372 of the joint assembly 120, which, in turn, moves the first part 370 of the joint assembly 120 into engagement with the second part 372. To prevent disengagement of the socket 390 with the fastener 398, the mounting plate 112 slides via the slide device 140 toward the second fixture 300 along the rotational axis of the joint assembly 120. Thus, actuation of the torque tool 102 causes rotation of the joint assembly 120. Rotation of the joint assembly 120 results in the joint assembly forming the hard joint where further rotation of the joint assembly is prohibited. The torque analyzer 124 indicates actual exerted torque on the hard joint as measured by the transducer 114. The transducer 114 can comprise a volatile data storage that is linked to the torque analyzer 124 so that torque values measured by the transducer 114 can be transmitted to the torque analyzer 124 where they are processed and digitized. The user can compare the actual exerted torque as measured by the transducer 114 to a torque value indicated on the torque tool 102 (e.g., the torque tool can include a force indicator that is mechanically connected to the head portion) and an adjustment of the torque tool is performed depending on the torque comparison.

The present disclosure further provides an exemplary method of calibrating a torque tool. The method includes mounting a head portion 104 of a torque tool 102 on a first fixture 220 provided on a movable mounting plate 112; mounting a transducer 114 on the first fixture 220 opposite the torque tool head portion 104; coupling one end portion 116 of the transducer 114 to a drive end 106 of the torque tool head portion 104 and coupling an opposite end portion 118 of the transducer 114 to a joint assembly 120 connected to a fixed second fixture 300 spaced from the mounting plate 112; applying a predetermined amount of torque to the joint assembly 120 and measuring actual exerted torque with the transducer 114; comparing the actual exerted torque to a torque value indicated on the torque tool 102 resulting in a torque comparison; and calibrating the torque tool 102 depending on the torque comparison.

The exemplary method further includes adjusting a height of the second fixture 300 so that a rotational axis of the joint assembly 120 is aligned with a rotational axis of the drive end 106 of the torque tool head portion 104. The method further includes moving a first part 370 of the joint assembly 120 into engagement with a fixed second part 372 of the joint assembly 120 to define a hard joint, and moving the mounting plate 112 toward the second fixture 300 as the first part 370 is moved toward the second part 372 of the joint assembly 120.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A torque tool calibration fixture comprising:
   a support;
   a mounting plate movably secured to the support, the plate being configured to have an associated torque tool mounted thereto for calibration;
   a transducer secured to the mounting plate for movement therewith, the transducer having one end portion configured to be coupled to a drive end of a head portion of the associated torque tool and an opposite end portion;
   a joint assembly fixed to the support and coupled to the opposite end portion of the transducer, the joint assembly defining a rotational axis, the mounting plate being movable along the rotational axis of the joint assembly; and
   a torque analyzer in communication with the transducer, wherein rotation of the joint assembly results in the joint assembly forming a hard joint where further rotation of the joint assembly is prevented, wherein the torque analyzer indicates actual exerted torque on the hard joint as measured by the transducer.

2. The fixture of claim 1, further including at least a pair of spaced parallel rails secured to the support, the mounting plate being attached to the rails such that the mounting plate is movable longitudinally of the rails to accommodate associated torque tools of different lengths.

3. The fixture of claim 1, further including a first fixture mounted to the mounting plate, the head portion of the associated torque tool being attached to the first fixture.

4. The fixture of claim 3, wherein a first holder is mounted to the first fixture, the first holder configured to have mounted to a first surface thereof the head portion of the associated torque tool, the first holder having an opening for receiving the drive end of the associated torque tool head portion.

5. The fixture of claim 4, wherein the transducer is mounted to a second opposite surface of the first holder.

6. The fixture of claim 3, further including a stationary second fixture mounted to the support, the joint assembly being connected to the second fixture.

7. The fixture of claim 6, wherein the second fixture includes a first member fixed to the support, a separate second member releasably secured to the first member, and a spacer interposed between the first and second members, the spacer providing for differing heights of the second fixture so that the rotational axis of the joint assembly is aligned with a rotational axis of the drive end of the associated torque tool head portion.

8. The fixture of claim 6, wherein a second holder is mounted to the second fixture, the second holder together with the joint assembly forming the hard joint.

9. The fixture of claim 1, wherein the joint assembly includes a first part and a separate second part, the first part being coupled to the transducer, the second part being fixed to the support so as not to move relative to the first part, engagement of the first and second parts forming the hard joint between the first and second parts.

10. The fixture of claim 9, further including a socket having one end coupled to the transducer and an opposite end coupled to the first part.

11. The fixture of claim 10, further including a fastener extending through an opening provided in the first part and threadingly engaged to the second part, the socket connected to the fastener, rotation of the fastener moving the first part into contact with the second part.

12. A torque tool calibration fixture comprising:
    a support;
    a mounting plate movably secured to the support, the plate having mounted thereto a torque tool for calibration;
    a first fixture mounted to the mounting plate, a head portion of the torque tool being attached the first fixture to prevent movement of the torque tool relative to the mounting plate;
    a transducer secured to the first fixture opposite the torque tool head portion, the transducer having one end portion coupled to a drive end of the torque tool head portion and an opposite end portion coupled to a joint assembly connected to a second fixture fixed to the support; and
    a torque analyzer in communication with the transducer, wherein actuation of the torque tool causes rotation of the joint assembly, wherein the torque analyzer indicates actual exerted torque on the joint assembly as measured by the transducer, the actual exerted torque is compared to a torque value indicated on the torque tool and an adjustment of the torque tool is performed depending on the torque comparison.

13. The fixture of claim 12, wherein the joint assembly includes a movable first part and a separate second part fixed to the second fixture, engagement of the first and second parts forming a hard joint between the first and second parts, the torque analyzer indicating actual exerted torque on the hard joint as measured by the transducer.

14. The fixture of claim 13, further including a socket having one end coupled to the transducer and an opposite end coupled to the first part.

15. The fixture of claim 14, further including a fastener extending through an opening provided in the first part and threadingly engaged to the second part, the socket connected to the fastener, rotation of the fastener moving the first part into contact with the second part.

16. The fixture of claim 12, further including a first holder secured to the first fixture and a second holder secured to the second fixture, the head portion of the torque tool mounted directly to the first holder and a part of the joint assembly mounted directly to the second holder, the first and second holders elevating the torque tool together with the transducer and joint assembly relative to the support.

17. The fixture of claim 16, wherein the second fixture includes a first member fixed directly to the support, a separate second member releasably secured to the first member, and a spacer interposed between the first and second members, the spacer providing for differing heights of the second fixture so that a rotational axis of the joint assembly is aligned with a rotational axis of the drive end of the torque tool head portion.

18. A method of calibrating a torque tool comprising:
mounting a head portion of a torque tool on a first fixture provided on a movable mounting plate;
mounting a transducer on the first fixture opposite the torque tool head portion;
coupling one end portion of the transducer to a drive end of the torque tool head portion and coupling an opposite end portion of the transducer to a joint assembly connected to a fixed second fixture spaced from the mounting plate;
applying torque to the joint assembly via the torque tool and measuring actual exerted torque with the transducer;
comparing the actual exerted torque to a torque value indicated on the torque tool resulting in a torque comparison; and
calibrating the torque tool depending on the torque comparison.

19. The method of claim 18, further comprising adjusting a height of the second fixture so that a rotational axis of the joint assembly is aligned with a rotational axis of the drive end of the torque tool head portion.

20. The method of claim 18, further comprising moving a first part of the joint assembly into engagement with a fixed second part of the joint assembly to define a hard joint, and moving the mounting plate toward the second fixture as the first part is moved toward the second part of the joint assembly.

* * * * *